(12) United States Patent
Shaw

(10) Patent No.: US 8,476,786 B2
(45) Date of Patent: Jul. 2, 2013

(54) SYSTEMS AND METHODS FOR ISOLATING CURRENT FLOW TO WELL LOADS

(75) Inventor: Joel D. Shaw, Houston, TX (US)

(73) Assignee: Halliburton Energy Services, Inc., Houston, TX (US)

(\*) Notice: Subject to any disclaimer, the term of this patent is extended or adjusted under 35 U.S.C. 154(b) by 369 days.

(21) Appl. No.: 12/819,938

(22) Filed: Jun. 21, 2010

(65) Prior Publication Data
US 2011/0309678 A1    Dec. 22, 2011

(51) Int. Cl.
*H02J 1/08* (2006.01)

(52) U.S. Cl.
USPC .......................................................... 307/31

(58) Field of Classification Search
USPC .......................................................... 307/31
See application file for complete search history.

(56) References Cited

U.S. PATENT DOCUMENTS

| | | | |
|---|---|---|---|
| 3,327,791 A * | 6/1967 | Harrigan, Jr. ................. | 175/4.55 |
| 3,427,580 A | 2/1969 | Brock | |
| 3,430,712 A | 3/1969 | Stafford | |
| 3,565,189 A | 2/1971 | Hart | |
| 3,575,650 A | 4/1971 | Fengler | |
| 3,717,095 A | 2/1973 | Vann | |
| 3,906,328 A | 9/1975 | Wenrich et al. | |
| 4,138,669 A | 2/1979 | Edison et al. | |
| 4,279,304 A | 7/1981 | Harper | |
| 4,303,128 A | 12/1981 | Marr | |
| 4,345,650 A | 8/1982 | Wesley | |
| 4,364,587 A | 12/1982 | Samford | |
| 4,396,062 A | 8/1983 | Iskander | |
| 4,442,903 A | 4/1984 | Schutt et al. | |
| 4,467,833 A | 8/1984 | Satterwhite et al. | |
| 4,485,780 A | 12/1984 | Price et al. | |
| 4,495,990 A | 1/1985 | Titus et al. | |
| 4,526,667 A | 7/1985 | Parkhurst et al. | |
| 4,527,636 A | 7/1985 | Bordon | |
| 4,570,715 A | 2/1986 | Van Meurs et al. | |
| 4,618,197 A | 10/1986 | White | |
| 4,638,138 A * | 1/1987 | Rosa et al. .................... | 219/668 |
| 4,716,960 A | 1/1988 | Eastlund et al. | |
| 4,747,451 A | 5/1988 | Adams, Jr. et al. | |
| 4,765,184 A | 8/1988 | Delatorre | |

(Continued)

FOREIGN PATENT DOCUMENTS

| | | |
|---|---|---|
| CN | 102947536 | 2/2013 |
| WO | WO2004012040 | 2/2004 |

(Continued)

OTHER PUBLICATIONS

PCT/US2011/038671, International Search Report and Written Opinion mailed Nov. 8, 2011, 8 pages.

*Primary Examiner* — Adi Amrany

(74) *Attorney, Agent, or Firm* — Kilpatrick Townsend & Stockton LLP

(57) ABSTRACT

Systems and methods for controlling power distribution among various electrical loads disposed in a bore are described. Control modules that are associated with loads such that each load is associated with at least one control module. Each control module includes circuitry that can respond to a voltage at a level that is above a threshold by allowing current to flow to its associated load, and that can prevent current from flowing to its associated load when a voltage level at another load, instead of the associated load, is above a threshold. The loads and control modules can be located in various zones in the wellbore.

18 Claims, 6 Drawing Sheets

U.S. PATENT DOCUMENTS

| | | | | |
|---|---|---|---|---|
| 4,911,239 | A | 3/1990 | Winckler et al. | |
| 4,919,201 | A | 4/1990 | Bridges et al. | |
| 4,921,438 | A | 5/1990 | Godfrey et al. | |
| 4,945,995 | A | 8/1990 | Tholance et al. | |
| 4,967,048 | A | 10/1990 | Langston | |
| 4,984,594 | A | 1/1991 | Vinegar et al. | |
| 4,992,709 | A * | 2/1991 | Griffin | 318/249 |
| 5,003,455 | A * | 3/1991 | Miller | 363/87 |
| 5,022,485 | A | 6/1991 | Mitchell | |
| RE33,690 | E | 9/1991 | Adams, Jr. et al. | |
| 5,058,683 | A | 10/1991 | Godfrey et al. | |
| 5,099,918 | A | 3/1992 | Bridges et al. | |
| 5,156,220 | A | 10/1992 | Forehand et al. | |
| 5,166,677 | A | 11/1992 | Schoenberg | |
| 5,207,273 | A | 5/1993 | Cates et al. | |
| 5,251,703 | A | 10/1993 | Skinner | |
| 5,279,363 | A | 1/1994 | Schultz et al. | |
| 5,282,508 | A | 2/1994 | Ellingsen et al. | |
| 5,332,035 | A | 7/1994 | Schultz et al. | |
| 5,343,963 | A | 9/1994 | Bouldin et al. | |
| 5,375,658 | A | 12/1994 | Schultz et al. | |
| 5,504,400 | A * | 4/1996 | Dalnodar | 315/291 |
| 5,516,603 | A | 5/1996 | Holcombe | |
| 5,547,029 | A | 8/1996 | Rubbo et al. | |
| 5,831,156 | A | 11/1998 | Mullins | |
| 5,839,508 | A | 11/1998 | Tubel et al. | |
| 5,868,201 | A | 2/1999 | Bussear et al. | |
| 5,896,076 | A | 4/1999 | van Namen | |
| 5,960,883 | A | 10/1999 | Rubel et al. | |
| 6,032,733 | A | 3/2000 | Ludwig et al. | |
| 6,164,375 | A | 12/2000 | Carisella | |
| 6,176,308 | B1 | 1/2001 | Pearson | |
| 6,179,052 | B1 | 1/2001 | Purkis et al. | |
| 6,247,536 | B1 | 6/2001 | Leismer et al. | |
| 6,315,043 | B1 | 11/2001 | Farrant et al. | |
| 6,315,049 | B1 | 11/2001 | Hickey et al. | |
| 6,433,991 | B1 | 8/2002 | Deaton et al. | |
| 6,450,263 | B1 | 9/2002 | Schwendemann | |
| 6,464,011 | B2 | 10/2002 | Tubel | |
| 6,470,970 | B1 | 10/2002 | Purkis et al. | |
| 6,547,010 | B2 | 4/2003 | Hensley et al. | |
| 6,567,013 | B1 | 5/2003 | Purkis et al. | |
| 6,575,237 | B2 | 6/2003 | Purkis et al. | |
| 6,585,051 | B2 | 7/2003 | Purkis et al. | |
| 6,668,936 | B2 | 12/2003 | Williamson, Jr. et al. | |
| 6,679,332 | B2 | 1/2004 | Vinegar et al. | |
| 6,684,950 | B2 | 2/2004 | Patel | |
| 6,700,432 | B2 * | 3/2004 | Misdom et al. | 327/419 |
| 6,725,925 | B2 | 4/2004 | Al-Ramadhan | |
| 6,736,213 | B2 | 5/2004 | Bussear et al. | |
| 6,782,952 | B2 | 8/2004 | Garay et al. | |
| 6,796,213 | B1 | 9/2004 | McKendree et al. | |
| 6,812,811 | B2 | 11/2004 | Robison et al. | |
| 6,912,142 | B2 | 6/2005 | Keim et al. | |
| 6,958,704 | B2 | 10/2005 | Vinegar et al. | |
| 6,967,589 | B1 | 11/2005 | Peters | |
| 7,007,756 | B2 | 3/2006 | Lerche et al. | |
| 7,011,152 | B2 | 3/2006 | Soelvik | |
| 7,017,662 | B2 | 3/2006 | Schultz et al. | |
| 7,038,332 | B2 | 5/2006 | Robison et al. | |
| 7,040,391 | B2 | 5/2006 | Leuthen et al. | |
| 7,066,261 | B2 | 6/2006 | Vicente et al. | |
| 7,145,471 | B2 | 12/2006 | Purkis et al. | |
| 7,210,534 | B2 | 5/2007 | Hayter et al. | |
| 7,322,409 | B2 | 1/2008 | Wittle et al. | |
| 7,440,283 | B1 | 10/2008 | Rafie | |
| 7,468,890 | B2 | 12/2008 | Lin | |
| 7,520,321 | B2 | 4/2009 | Hiron et al. | |
| 8,143,806 | B2 * | 3/2012 | Mosebrook et al. | 315/291 |
| 2001/0037884 | A1 | 11/2001 | Schultz et al. | |
| 2001/0042626 | A1 | 11/2001 | Patel | |
| 2002/0014338 | A1 | 2/2002 | Purkis et al. | |
| 2002/0050354 | A1 | 5/2002 | Schultz et al. | |
| 2002/0066573 | A1 | 6/2002 | Patel | |
| 2003/0048197 | A1 | 3/2003 | Purkis et al. | |
| 2003/0051881 | A1 | 3/2003 | Vinegar et al. | |
| 2003/0131986 | A1 | 7/2003 | Schultz et al. | |
| 2003/0131990 | A1 | 7/2003 | Tubel et al. | |
| 2010/0059233 | A1 | 3/2010 | Smithson et al. | |
| 2010/0236790 | A1 * | 9/2010 | Smithson | 166/373 |
| 2010/0237698 | A1 * | 9/2010 | Smithson | 307/38 |
| 2011/0067854 | A1 | 3/2011 | Love et al. | |
| 2011/0210609 | A1 * | 9/2011 | Smithson et al. | 307/38 |

FOREIGN PATENT DOCUMENTS

| | | |
|---|---|---|
| WO | WO2004081335 | 9/2004 |
| WO | WO2010030266 | 3/2010 |
| WO | WO2010030422 | 3/2010 |
| WO | WO2010030423 | 3/2010 |

* cited by examiner

SYSTEMS AND METHODS FOR ISOLATING CURRENT FLOW TO WELL LOADS

TECHNICAL FIELD OF THE INVENTION

The present invention relates generally to controlling power to downhole devices in a subterranean wellbore and, more particularly (although not necessarily exclusively), to isolating current flow in loads in the subterranean wellbore.

BACKGROUND

Hydrocarbons can be produced through a wellbore traversing a subterranean formation. The wellbore can be relatively complex in that it can include various zones defined by zonal isolation devices. Completion and production in each zone can be configured and controlled independent of other zones. Each zone can also include one or more downhole electrical loads (or tools) that operate using electric power. Examples of these loads include pumps, solenoid operated valves, and motors.

Electric power can be delivered to these loads through cables or other types of conducting paths. A tubing encapsulated conductor ("TEC") can be used that includes three conductors surrounded by a sheath. Because the wellbore can be long—requiring a long cable—the TEC is used with diodes downhole to control power to up to twelve different downhole loads, instead of using two cables per load, which increases costs. For example, one downhole load can receive full power independent of other loads, by applying voltage to one of the conducting paths or to the sheath, grounding another one of the conducting paths (or the sheath if applicable), and leaving the remaining conducting paths (or remaining path and sheath if applicable) floating electrically.

Although the one load receives power to operate fully independent of the remaining loads through this implementation, one or more leak paths can be present through which current can flow away from the one load in full operation. For example, in an implementation of twelve independent loads that have a similar resistive value, (i) one half of the power provided down the conducting paths is supplied to the one load intended to be powered, (ii) one quarter of the power is supplied through a second path in which two loads are between positive voltage and ground, and (iii) one quarter of the power is supplied through a third path in which another two loads are between positive voltage and ground.

Thus, the leak paths can waste half of the power that is supplied downhole and the leak paths can result in the loads in the leak paths being provided only part of the power that the loads require to operate fully. Providing part of the power to the loads can cause some loads (e.g. a motor or a pump) to operate partially when such operation is not desirable. Furthermore, certain loads may require different power levels to operate such that a load in a leak path operates fully when such operation is not desirable.

Therefore, systems and methods are desirable that can reduce or eliminate loads receiving current through leak paths or other undesirable ways in a downhole setting.

SUMMARY

Certain embodiments of the present invention are directed to controlling power distribution among various electrical loads disposed in a bore. Each load can be associated with circuitry that can prevent leak currents from flowing to the associated loads. The circuitry can include one or more thyristors that can allow current to flow in response to a threshold voltage being exceeded, but otherwise can prevent current flow.

In one aspect, a system is provided that can be disposed in a bore of a subterranean formation. The bore can have various electrical loads positioned in it. The system can include a first control module and control modules other than the first control module. The first control module is associated with a first load and can respond to a voltage that is above a threshold by allowing current to flow to the first load. When the current is allowed to flow to the first load, the control modules other than the first control module are configured to prevent current from flowing to loads other than the first load.

In at least one embodiment, the first control module includes a thyristor having a gate.

In at least one embodiment, the gate is coupled to a resistor network. The thyristor can allow current to flow to the first load when the voltage that is above the threshold is applied to the gate.

In at least one embodiment, the gate is disconnected from other circuitry and the threshold corresponds to a breakdown voltage of the thyristor.

In at least one embodiment, the thyristor includes one of a silicon controlled rectifier (SCR), a diode for alternating current (DIAC), a four layer diode with a disconnected gate, or a triode for alternating current (TRIAC).

In at least one embodiment, the system includes various conducting paths. Each path can conduct electricity in the bore. In response to a first conducting path being coupled to a power source and a second conducting path being coupled to ground, the first control module can allow current to flow to the first load and the control modules other than the first control module can prevent current from flowing to loads other than the first load.

In at least one embodiment, the conducting paths include a third conducting path that can float when the first control module allows current to flow to the first load and when the control modules other than the first control module can prevent current from flowing to loads other than the first load.

In at least one embodiment, a conducting path is a sheath that encapsulates other conducting paths.

In at least one embodiment, the bore includes zones defined therein by zonal isolation devices. The loads are disposed in the zones.

In at least one embodiment, the first control module includes a first thyristor and a second thyristor that is biased in an opposite direction than the first thyristor. The first thyristor can allow current flowing in a first direction to flow to the first load. The second thyristor can allow current flowing in a second direction to flow to the first load.

In another aspect, a method is provided for controlling power distribution downhole. A level of a voltage is determined as being above a threshold in at least one zone of a subterranean bore. The voltage is determined from a first conducting path coupled to a power source and a second conducting path coupled to ground. In response to determining the level of the voltage is above the threshold, current is allowed to flow to a first load that is disposed in the zone. Current is prevented from flowing to loads other than the first load that are disposed in the plurality of zones.

In at least one embodiment, a gate voltage is determined at a gate of a thyristor as being above the threshold to determine the level of the voltage. The thyristor is associated with a load in the zone.

In at least one embodiment, a breakdown voltage of a thyristor is determined as being above the threshold to determine the level of the voltage. The thyristor is associated with a load in the zone.

In at least one embodiment, a third conducting path is allowed to be floating.

In at least one embodiment, the level of the voltage at a load other than the first load is determined to be below the threshold. Current is prevented from flowing to the load other than the first load in response to determining the level of the voltage is below the threshold.

These illustrative aspects and embodiments are mentioned not to limit or define the invention, but to provide examples to aid understanding of the inventive concepts disclosed in this application. Other aspects, advantages, and features of the present invention will become apparent after review of the entire application.

DETAILED DESCRIPTION

Figure 1:
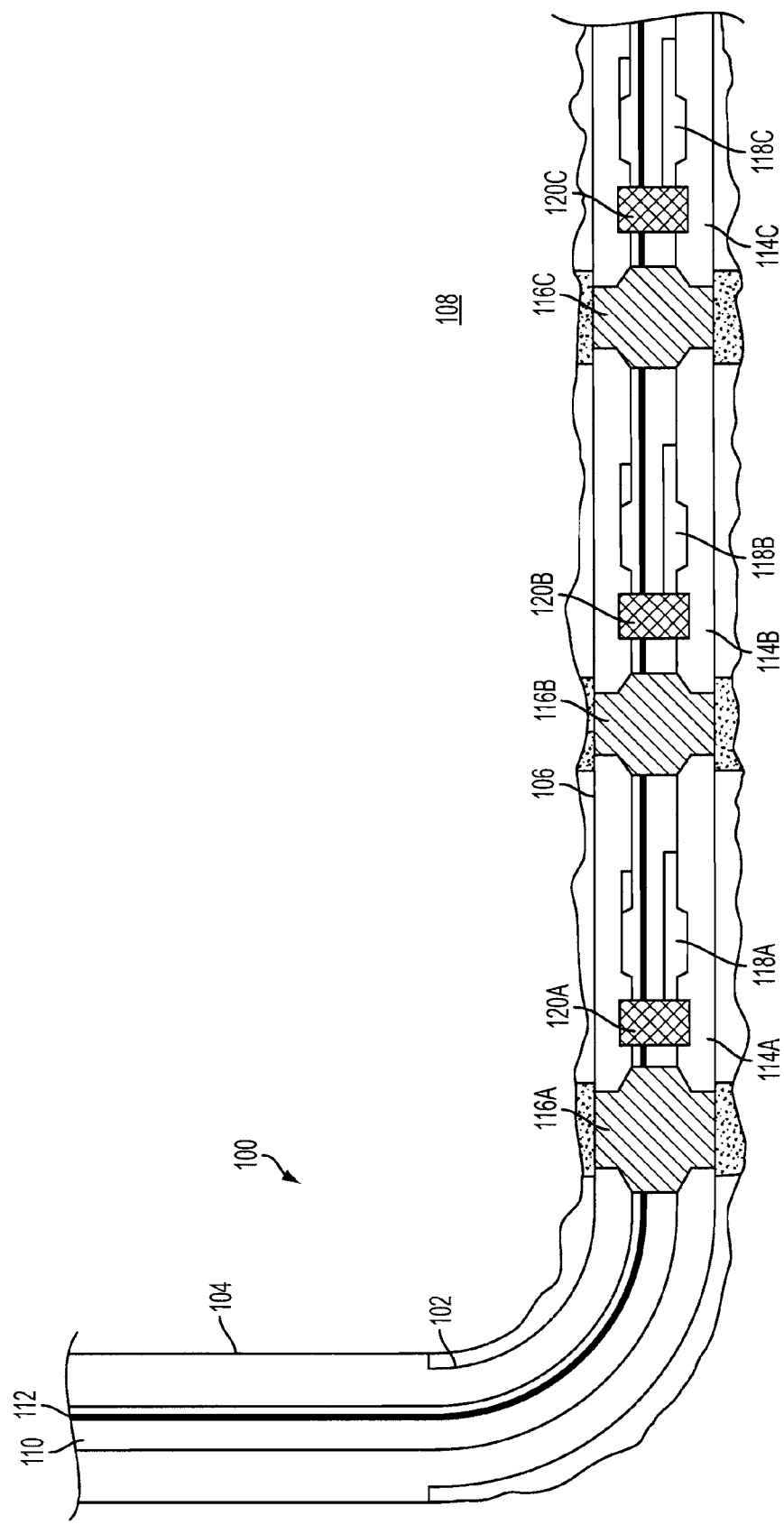
FIG. 1 is a cross-sectional schematic illustration of a well having a system that can control current flow to loads to prevent or reduce leak currents according to an embodiment of the present invention.

Certain aspects and embodiments of the present invention relate to systems and methods for controlling power distribution among various loads disposed in a bore, such as a wellbore of a subterranean formation, to which power is delivered through a limited number of conducting paths. A system according to some embodiments includes control modules that are associated with loads such that each load is associated with at least one control module. Each control module includes circuitry that is capable of responding to a voltage at a level that is above a threshold by allowing current to flow to its associated load, and that is capable of preventing current from flowing to its associated load when a voltage level at another control module is above a threshold. The loads and control modules can be located in various zones in the wellbore.

Various types of circuitry can be used to respond to a threshold voltage by allowing current to flow to an associated load. Circuitry according to various embodiments can also prevent current from flowing when voltage is above a threshold at another control module that includes its own circuitry. Examples of circuitry include a thyristor and a circuit for providing a voltage at a gate of the thyristor. Examples of the types of thyristors that can be used include silicon controlled rectifier (SCR), a diode for alternating current (DIAC), a four layer diode with a disconnected gate, and a triode for alternating current (TRIAC).

In some embodiments, a conducting path is electrically coupled to a power source and another conducting path is electrically coupled to ground. Other conducting paths are allowed to float, such as not being electrically coupled to ground or to a voltage source. Control modules include circuitry that can control current flow through a load based on a voltage threshold, such as a gate voltage that is provided by the power source. The circuitry can include, for example, a thyristor that can block current until a voltage on a gate of the thyristor exceeds the threshold level. In response to the voltage level being above the threshold level, the thyristor allows current to flow to the load, but blocks current flow in an opposite direction. Current is allowed to continue flowing to the load, even if the gate voltage is no longer present, until the current diminishes to zero amperes.

The other control modules in the system can also include circuitry, such as thyristors, that control current flow to associated loads, based on threshold voltages. When power is applied, more current (e.g. twice as much) flows to the desired load as compared to paths that include loads that are not desired to be "turned on." The current traveling through the control modules associated with these "undesired" loads can be configured to be below the voltage thresholds for those control modules such that the control modules prevent current from flowing to associated loads.

In other embodiments, the voltage threshold is a breakdown voltage of circuitry, such as a thyristor, in the forward-biased direction. When the breakdown voltage is applied, the circuitry can be configured to allow current to flow to an associated load, but otherwise can prevent current from flowing to associated loads.

In some embodiments, the loads are motors and each control module includes thyristor pairs that are in parallel, but are in opposite directions such that one thyristor allows current to flow in one direction and the other thyristor allows current to flow in the opposite direction. This type of circuitry configuration can allow the motor to be operated either forward or backward.

Systems according to certain embodiments can increase downhole power availability by, for example, preventing or reducing power loss through leak paths. Loads other than the desired load can be prevented from operating based on partial power or otherwise. Issues caused by different resistances of conducting paths can be reduced. Some embodiments can allow for various types and sizes of loads to be used and controlled downhole.

In one embodiment, twelve loads are disposed downhole in a wellbore. At least some of the loads are in different zones of the wellbores than zones in which other loads are located. Each load is associated with a control module that can control current that can flow to the associated load. A tubing encapsulated conductor (TEC) cable is run downhole. The TEC cable includes three wires encapsulated in a sheath. The three wires and the sheath are conducting paths. The conducting paths are electrically coupled to the loads, such that each load is associated with two conducting paths. Power can be provided to a load by providing a voltage potential to one of the conducting paths to which it is electrically coupled and electrically coupling to ground the other conducting path. The remaining conducting paths can be left floating. The control module associated with the load allows the current to flow to the load. Control modules associated with other loads prevents the current, or part of the current, from flowing to the other loads.

These illustrative examples are given to introduce the reader to the general subject matter discussed here and are not intended to limit the scope of the disclosed concepts. The following sections describe various additional embodiments and examples with reference to the drawings, in which like numerals indicate like elements and directional descriptions are used to describe the illustrative embodiments but, like the illustrative embodiments, should not be used to limit the present invention.

FIG. 1 depicts a well system 100 with control systems according to certain embodiments of the present invention. The well system 100 includes a bore that is a wellbore 102 extending through various earth strata. The wellbore 102 has a substantially vertical section 104 and a substantially horizontal section 106. The substantially vertical section may include a casing string cemented at an upper portion of the substantially vertical section 104. The substantially horizontal section 106 is open hole and extends through a hydrocarbon bearing subterranean formation 108.

A tubing string 110 extends from the surface within wellbore 102. The tubing string 110 can provide a conduit for formation fluids to travel from the substantially horizontal section 106 to the surface. A cable 112 extends along the tubing string 110. Cable 112 may be any type of suitable cable—an example of which is a TEC cable—that can include various, and any number of, conducting paths.

The tubing string 110 is divided into zones 114A-C using zonal isolation devices 116A-C. An example of a zonal isolation device is a packer. Zonal isolation devices 116A-C may be made from materials that can expand upon contact with a fluid, such as hydrocarbon fluids, water, and gasses. The material can expand to provide a pressure seal between two zones. Loads 118A-C can be disposed in the zones 114A-C. Although FIG. 1 depicts one load in each zone, each zone in some embodiments can include any number of loads. Loads 118A-C can be any device capable of being disposed in the wellbore 102 and capable of control via electricity. Examples of loads 118A-C include motors, solenoid actuated valves, pumps, and gauges. FIG. 1 depicts only three zones 114A-C. However, well systems according to various embodiments of the present invention can include any number of zones with any number of loads.

Control modules 120A-C can be disposed in the zones 114A-C and associated with loads 118A-C. For example, control module 120A is associated with load 118A that is in zone 114A, control module 120B is associated with load 118B that is in zone 114B, and control module 120C is associated with load 118C that is in zone 114C. In other embodiments, one control module is associated with more than load. Each control module can include circuitry that controls current flow to the associated load. One of the conducting paths can be coupled to a voltage source, and another conducting path can be coupled to ground, to cause current to flow to the loads and the control modules 120A-C can control whether the current flows to the associated loads 118A-C. For example, one control module can allow current to flow to a load associated with it and other control modules can prevent current from flowing to loads associated with the other control modules.

In one embodiment, a level of a voltage in zone 114A is determined as being above a certain threshold voltage. The voltage is provided by coupling a conducting path to a voltage source and coupling another conducting path to ground. Any remaining conducting paths of the cable 112 can remain floating. In response to determining that the voltage level is above the threshold, control module 120A allows current to follow to the associated load 118A that is disposed in zone 114A. Control modules 120B-C prevent current from flowing to loads 118B-C in zones 114B-C.

FIG. 1 shows zones 114A-C with loads 118A-C and control modules 120A-C according to certain embodiments of the present invention in the substantially horizontal section 106 of the wellbore 102. Such systems according to various embodiments of the present invention, however, can be used in other types of wellbores, such as deviated, vertical, or multilateral wellbores. Deviated wellbores may include directions different than, or in addition to, a general horizontal or a general vertical direction. Multilateral wellbores can include a main wellbore and one or more branch wellbores. Directional descriptions are used herein to describe the illustrative embodiments but, like the illustrative embodiments, should not be used to limit the present invention.

Figure 2:
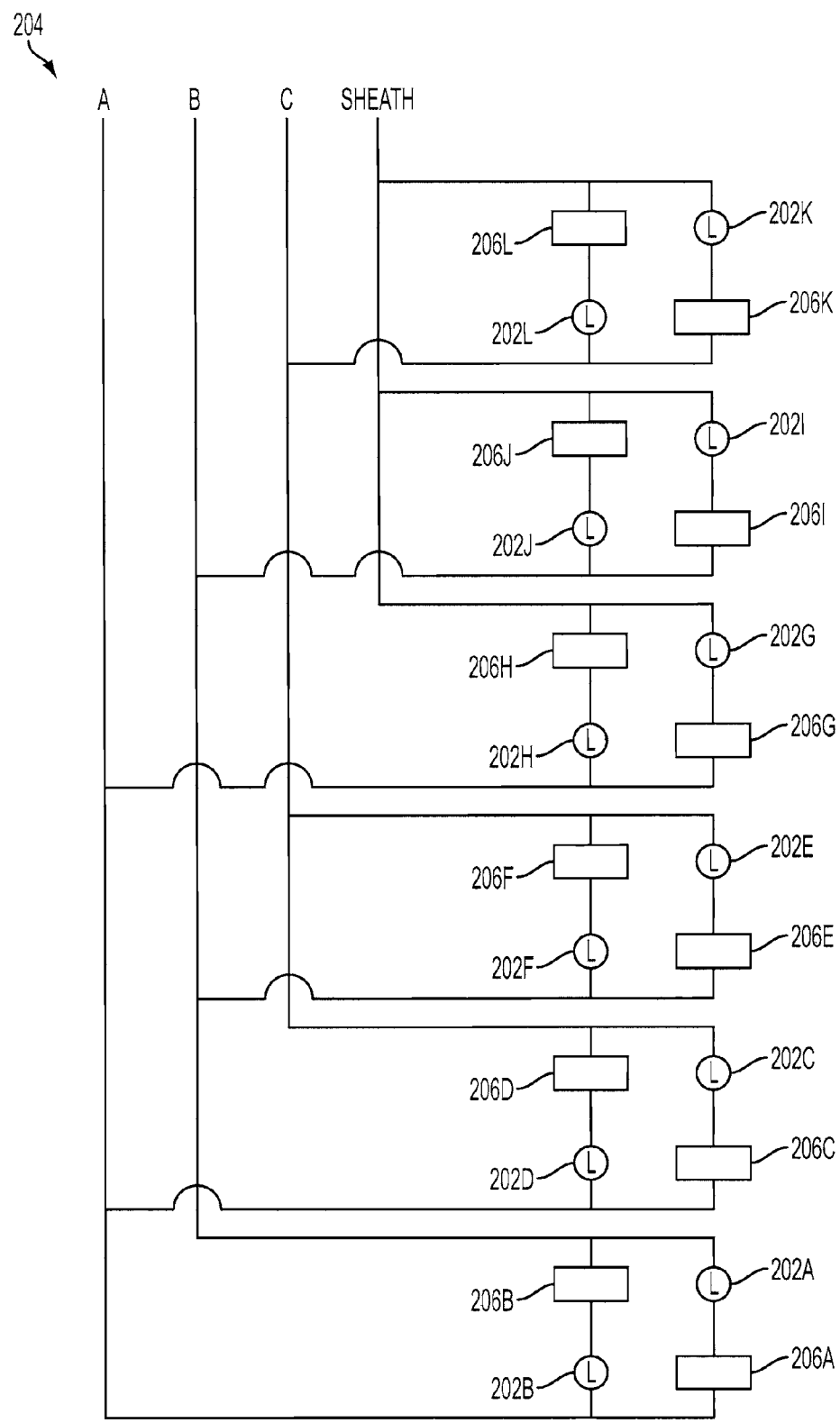
FIG. 2 is a schematic view of a control system according to an embodiment of the present invention.

FIG. 2 schematically depicts a model of twelve loads 202A-L electrically coupled to conducing paths 204 through twelve control modules 206A-L. The conducting paths 204 depicted in FIG. 2 include path A, path B, path C, and a sheath path. The conducting paths 204 can be in a single cable disposed in a subterranean well.

Each load is associated with a control module that is capable of allowing or preventing current to flow to the associated load. Power can be provided to a desired load by coupling one of the conducting paths 204 to a voltage source, coupling another one of the conducting paths 204 to ground, and allowing the other two conducting paths to float.

For example, coupling path A to a voltage source and path B to ground can allow current to flow to control module 206A, and may allow leak current to flow to other control modules. The control module 206A can include circuitry that, in response to a current or voltage that is above a threshold, allows current to flow to load 202A. The control modules 206B-L can be capable of preventing current, including leak currents, from flowing to the loads 202B-L associated with the control modules 206B-L. For example, the circuitry in the control modules 206B-L can be configured to respond to a current or voltage level at or above a certain threshold by allowing current to flow, where such threshold is higher than that provided by most or all leak currents. The control modules 206B-L can be configured to prevent currents or voltages below that threshold, such as in leak currents, from flowing to the loads 202B-L associated with the control modules 206B-L.

Certain embodiments of the system shown in FIG. 2 allow for the twelve loads 202A-L to be operated using a three-conductor TEC that form conducting paths 204. In some embodiments, the twelve loads 202A-L can be controlled using three wellhead penetrations and three quarter inch hydraulic lines. Although embodiments are described as using three to four conducting paths via lines or wires, any number of conducting paths, implemented using any number of lines or wires, can be used.

Various types of circuitry can be used in control modules according to certain embodiments to control current flow to loads in downhole implementations. Such circuitry can be configured to prevent or reduce loads from "turning on" due to leak currents or otherwise. FIGS. 3-6 depict equivalent schematics of a downhole implementation of various loads and various types of circuitry. However, other types of circuitry, other than those depicted in FIGS. 3-6, may be used.

Figure 3:
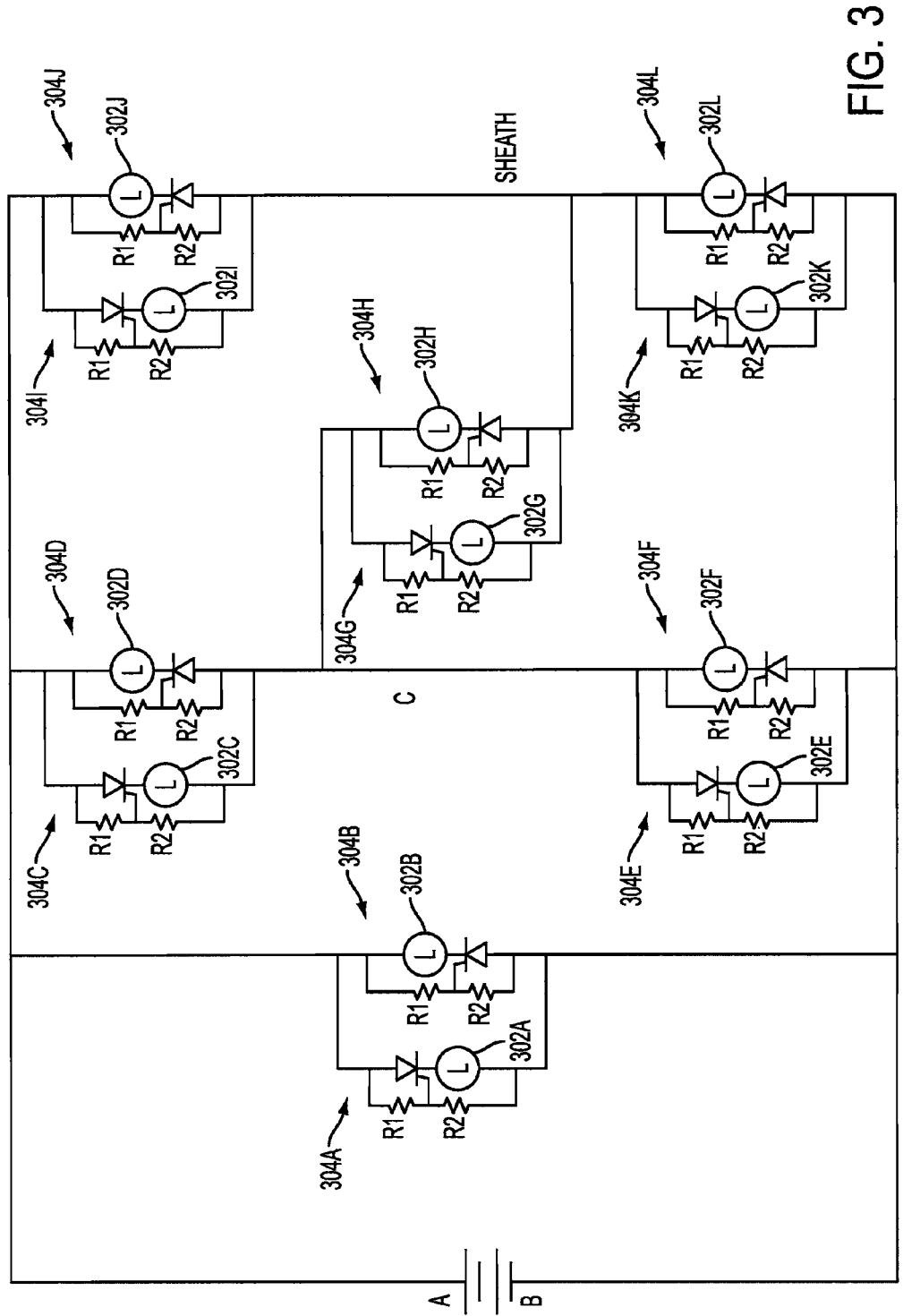
FIG. 3 is a schematic view of a control system providing power to a load according to an embodiment of the present invention.

FIG. 3 schematically shows conducting path A coupled to a voltage source, conducting path B coupled to ground, and conducting path C and the sheath (which is also a conducting path) allowed to float. Twelve loads 302A-L are associated with control modules 304A-L that have circuitry. The circuitry for the each of the control modules 304A-L include a thyristor and a resistor network, such as pair R1, R2. In some embodiments, the thyristor is a silicon controlled rectifier (SCR). The thyristor includes an anode coupled to a conducting path (or sheath as applicable), a cathode coupled to the respective load, and a gate that is coupled to the resistor pair R1, R2.

By coupling conducting path A to a voltage source and conducting path B to ground, load 302A is the desired load to be operated, or otherwise "turned on" in a downhole implementation. Circuitry for control module 304A can be configured to allow current to flow to the load 302A. For example, current flows through R1 and R2 to provide a voltage on the gate of the thyristor. The resistor values can be selected such that a voltage is provided on the gate of the thyristor when it is desired to operate the load 302A. The resistor values may depend on the resistive properties of the load 302A. Examples of values are ten kilohms for R1 and one kilohm for R2.

In response to the voltage at the gate being above a threshold voltage, the thyristor allows current to flow to the load 302A and the load 302A operates. The thyristor allows current to flow regardless of the gate voltage, until the current from the anode to the cathode drops to zero (or close thereto).

Some current in conducting path A may also flow to circuitry associated with at least some of the other loads, along leak paths for example. The resistance in these leak paths, however, is twice or more as great as that of the path through circuitry of control module 304A. The resistors in the other circuitry can be configured such that a voltage is provided at the gates of these other circuitry that is below a voltage threshold. Thus, the other circuitry can prevent current from flowing to these other loads because the gate voltage is below the threshold voltage. The other loads can be prevented from "turning on" or otherwise from operating partially and fully.

Figure 4:
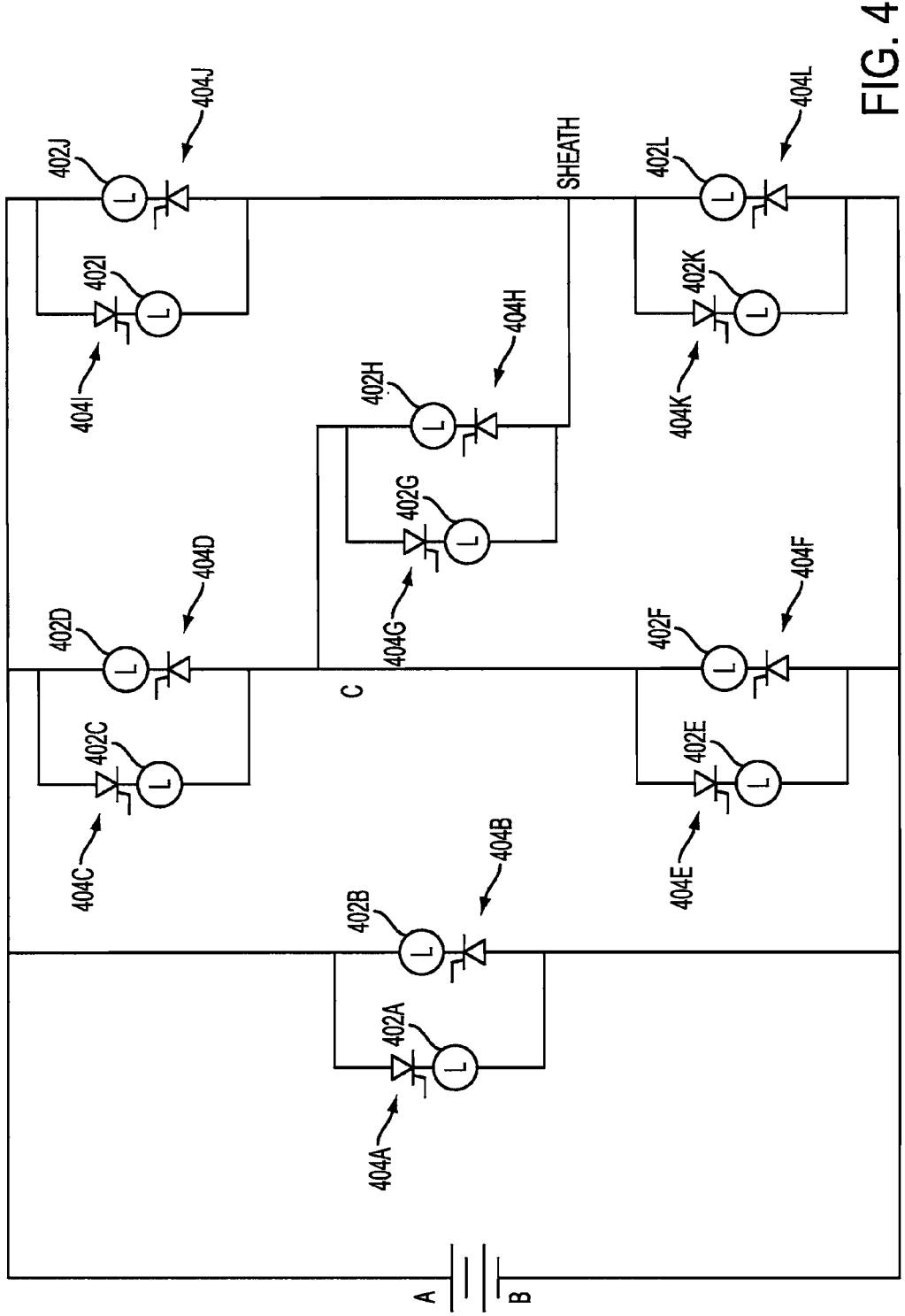
FIG. 4 is a schematic view of a control system providing power to a load according to a second embodiment of the present invention.

In some embodiments, the threshold voltage is a breakdown voltage. FIG. 4 schematically shows loads 402A-L in a similar configuration as those in FIG. 3, except that each of control modules 404A-L has circuitry that includes a thyristor with a gate that is not connected to other circuitry. Instead, each thyristor (which may be an SCR) has a breakdown voltage in the forward-biased direction such that, when the breakdown voltage is exceeded, the thyristor responds by allowing current to flow to the associated load. For example, when voltage is applied via conducting path A, it exceeds the breakdown voltage of the thyristor of circuitry of control module 404A, but does not exceed the breakdown voltage of the thyristors for circuitry of control modules 404B-L. In some embodiments, the voltage exceeds the breakdown voltages of (in addition to circuitry of control module 404A) the thyristor for circuitry of control module 404C and the thyristor for circuitry of control module 404I, but does not exceed the breakdown voltages of thyristors of other circuitry and, thus a circuit is not completed for any load but load 402A.

Figure 5:
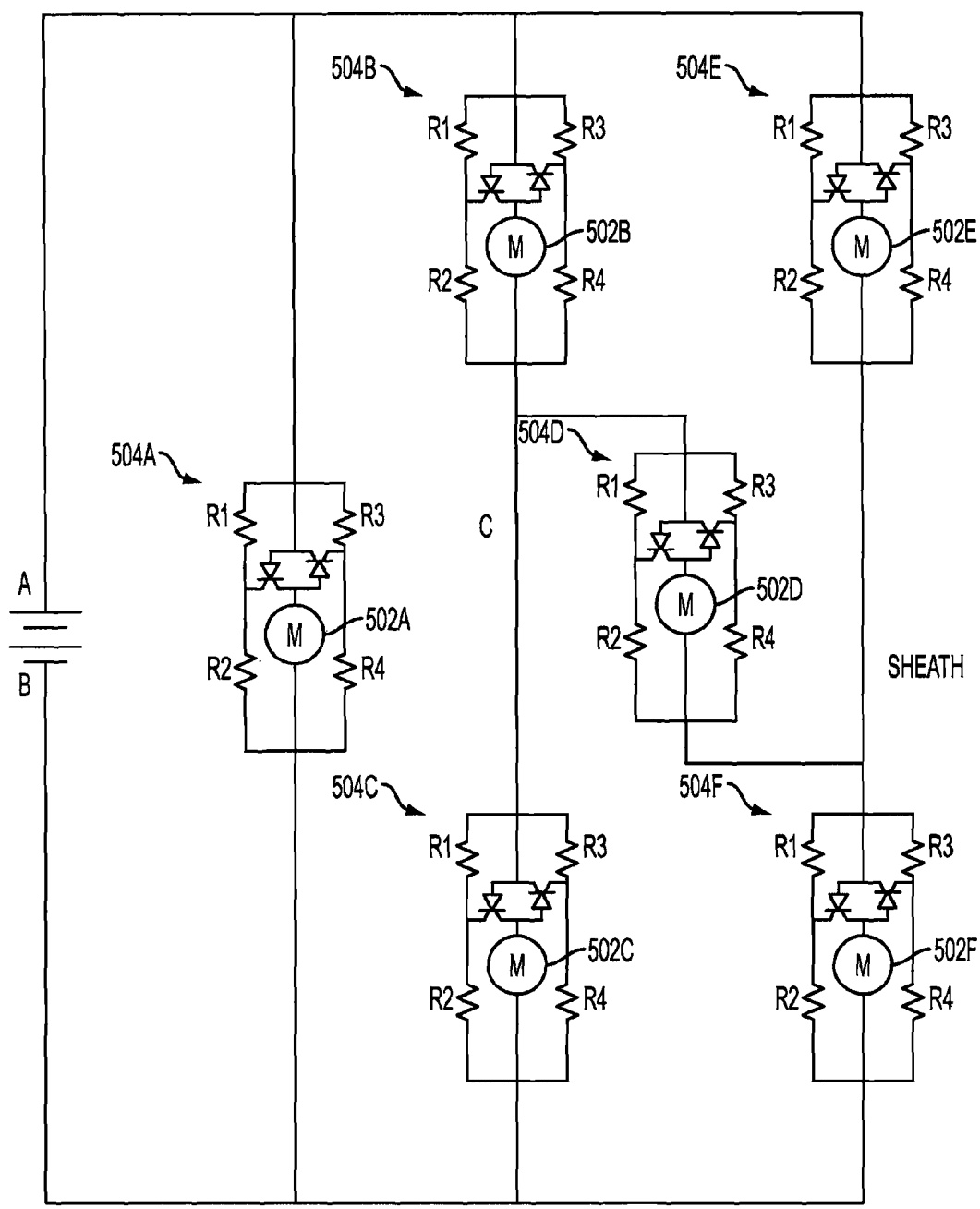
FIG. 5 is a schematic view of a control system providing power to a load according to a third embodiment of the present invention.

Circuitry according to some embodiments can be used to control various types of loads, such as bidirectional motors. FIG. 5 schematically shows six loads that are bidirectional DC motors 502A-F. The bidirectional DC motors 502A-F are associated control modules 504A-F. Each control module has circuitry that includes two thyristors and a resistor network that includes four resistors R1, R2, R3, and R4. The two thyristors are in parallel, but are biased in opposite directions such that when current flows in one direction (e.g. from conducting path A to conducting path B), one thyristor allows current to flow to the associated motor to cause it to operate in accordance with current flow in the first direction. When current flows in the opposite direction (e.g. from conducting path B to conducting path A), the second thyristor allows current to flow to the associated motor to cause it to operate in accordance with the current flow in the second direction that is opposite to the first direction. The resistors R1, R2, R3, and R4 operate similar to the resistors of the embodiment depicted in FIG. 3 to provide a voltage at the gate of the thyristors. In some embodiments, the thyristors have gates that are disconnected from other circuitry, similar to those depicted in FIG. 4. The thyristors are configured to prevent current from flowing to the motors 502A-F unless the associated motor is desired to be operated.

Figure 6:
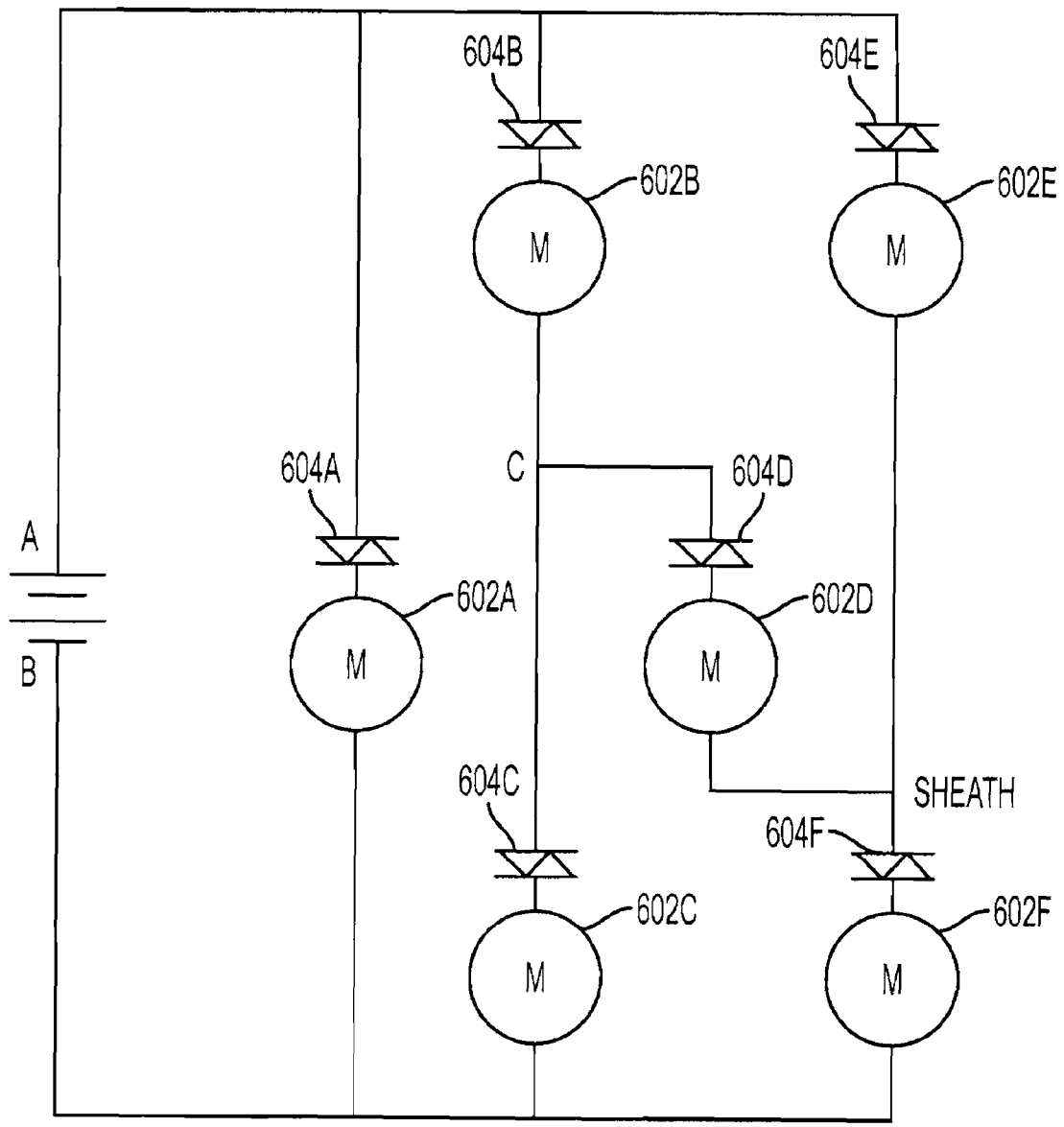
FIG. 6 is a schematic view of a control system providing power to a load according to a fourth embodiment of the present invention.

Circuitry according to various embodiments can include any type of thyristor or other similar circuitry. Examples of thyristors include an SCR, a diode for alternating current (DIAC or SiDIAC), a four layer diode with a disconnected gate, and a triode for alternating current (TRIAC). FIG. 6 schematically shows six loads that are motors 602 A-F. The motors 602A-F are associated with control modules that include DIACs 604A-F. In the configuration shown in FIG. 6, DIAC 604A allows current to flow to motor 602A in either direction. DIACs 604B-F are capable of preventing current from flowing to the other motors 602B-F because the current and/or voltage fails to exceed a threshold when current is allowed to flow to the motor 602A.

The foregoing description of the embodiments, including illustrated embodiments, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A system for coupling to conducting paths that include a sheath conducting path, a first conducting path, a second conducting path, and a third conducting path, the system comprising:
    a first control module configured for coupling to the first conducting path and for being in electrical series with a first well load coupled to the second conducting path;
    a second control module configured for coupling to the second conducting path and for being in electrical series with a second well load coupled to the first conducting path;
    a third control module configured for coupling to the first conducting path and for being in electrical series with a third well load coupled to the third conducting path; and
    a fourth control module configured for coupling to the first conducting path and for being in electrical series with a fourth well load coupled to the sheath conducting path,
    wherein the second control module, third control module, and fourth control module prevent leak current from flowing to the second well load, third well load, and fourth well load, respectively, when the first control module allows current to flow to the first well load.

2. The system of claim 1, wherein each of the first control module, the second control module, the third control module, and the fourth control module comprises a thyristor having a gate.

3. The system of claim 2, wherein the gate is coupled to a resistor network, the thyristor being configured to allow current to flow to a well load associated with the respective control module when a voltage that is above the threshold is applied to the gate.

4. The system of claim 2, wherein the gate is disconnected from other circuitry,
    wherein the threshold corresponds to a breakdown voltage of the thyristor.

5. The system of claim 2, wherein the thyristor comprises at least one of:
    a silicon controlled rectifier (SCR);
    a diode for alternating current (DIAC);

a four layer diode with a disconnected gate; or
a triode for alternating current (TRIAC).

6. The system of claim 1, further comprising:
wherein, in response to the first conducting path being coupled to a power source, second conducting path being coupled to ground, and the third conducting path and the sheath conducting path being allowed to flow, the first control module is configured to allow current to flow to the first well load and the second control module, the third control module, and the fourth control module are configured to prevent current from flowing to the second well load, the third well load, and the fourth well load.

7. The system of claim 1, wherein the sheath conducting path is a sheath that encapsulates the first conducting path, the second conducting path, and the third conducting path.

8. The system of claim 1, wherein the system is located in a bore that includes zones defined therein by isolation packers, the well loads being disposed among the zones.

9. The system of claim 1, wherein the first control module comprises a first thyristor and a second thyristor that is biased in an opposite direction than the first thyristor, the first thyristor being configured to allow current flowing in a first direction to flow to the first well load, the second thyristor being configured to allow current flowing in a second direction to flow to the first well load.

10. The system of claim 1, wherein the first well load is a motor, the second well load is a solenoid actuated valve, the third well load is a pump, and the fourth well load is a gauge.

11. The system of claim 1, wherein the sheath conducting path is a grounded conducting path and the second conducting path and the third conducting path are floating conducting paths.

12. The system of claim 1, further comprising:
a fifth control module configured for coupling to the third conducting path and for being in electrical series with a fifth well load coupled to the first conducting path;
a sixth control module configured for coupling to the second conducting path and for being in electrical series with a sixth well load coupled to the third conducting path;
a seventh control module configured for coupling to third conducting path and for being in electrical series with a seventh well load coupled to the second conducting path;
an eighth control module configured for coupling to the sheath conducting path and for being in electrical series with an eighth well load coupled to the first conducting path;
a ninth control module configured for coupling to the second conducting path and for being in electrical series with a ninth well load coupled to the sheath conducting path;
a tenth control module configured for coupling to the sheath conducting path and for being in electrical series with a tenth well load coupled to the second conducting path;
an eleventh control module configured for coupling to the third conducting path and for being in electrical series with an eleventh well load coupled to the sheath conducting path; and
a twelfth control module configured for coupled to the sheath conducting path and for being in electrical series with a twelfth well load coupled to the third conducting path.

13. The system of claim 12, wherein the fifth control module, the sixth control module, the seventh control module, the eighth control module, the ninth control module, the tenth control module, the eleventh control module, and the twelve control module prevent leak current from flowing to the fifth well load, the sixth well load, the seventh well load, the eighth well load, the ninth well load, the tenth well load, the eleventh well load, and the twelve well load, respectively, when the first control module allows current to flow to the first well load.

14. A method, comprising:
allowing current to flow to a first well load in a wellbore by a first control module coupled to a first conducting path and in electrical series with the first well load that is coupled to a second conducting path; and
substantially simultaneous to the first control module allowing current to flow to the first well load,
preventing leak current from flowing to a second well load in the wellbore by a second control module coupled to the second conducting path and in electrical series with the second well load that is coupled to the first conducting path;
preventing leak current from flowing to a third well load in the wellbore by a third control module coupled to the first conducting path and in electrical series with the third well load that is coupled to a third conducting path; and
preventing leak current from flowing to a fourth well load in the wellbore by a fourth control module coupled to the first conducting path and in electrical series with the fourth well load that is coupled to a sheath conducting path.

15. The method of claim 14, wherein the sheath conducting path is formed by a sheath that encapsulates the first conducting path, the second conducting path, and the third conducting path.

16. The method of claim 14, wherein the first well load, the second well load, the third well load, and the sheath well load are disposed among wellbore zones that are defined by isolation packers.

17. The method of claim 14, wherein the first well load is a motor, the second well load is a solenoid actuated valve, the third well load is a pump, and the fourth well load is a gauge.

18. The method of claim 14, further comprising:
substantially simultaneous to the first control module allowing current to flow to the first well load,
preventing leak current from flowing to a fifth well load in the wellbore by a fifth control module coupled to the third conducting path and in electrical series with the fifth well load that is coupled to the first conducting path;
preventing leak current from flowing to a sixth well load in the wellbore by a sixth control module coupled to the second conducting path and in electrical series with the sixth well load that is coupled to the third conducting path;
preventing leak current from flowing to a seventh well load in the wellbore by a seventh control module coupled to the third conducting path and in electrical series with the seventh well load that is coupled to the second conducting path;
preventing leak current from flowing to an eighth well load in the wellbore by an eighth control module coupled to the sheath conducting path and in electrical series with the eighth well load that is coupled to the first conducting path;
preventing leak current from flowing to a ninth well load in the wellbore by a ninth control module coupled to the second conducting path and in electrical series with the ninth well load that is coupled to the sheath conducting path;

preventing leak current from flowing to a tenth well load in the wellbore by a tenth control module coupled to the sheath conducting path and in electrical series with the tenth well load that is coupled to the second conducting path;

preventing leak current from flowing to an eleventh well load in the wellbore by an eleventh control module coupled to the third conducting path and in electrical series with the eleventh well load that is coupled to the sheath conducting path; and preventing leak current from flowing to a twelfth well load in the wellbore by a twelfth control module coupled to the sheath conducting path and in electrical series with the twelfth well load that is coupled to the third conducting path.

* * * * *